Aug. 27, 1963 T. W. BUNYAN 3,101,621
RECIPROCATING ENGINES
Filed Nov. 25, 1960 4 Sheets-Sheet 1

INVENTOR
Thomas W. Bunyan
BY
Kemon, Palmer & Stewart
ATTORNEY

United States Patent Office 3,101,621
Patented Aug. 27, 1963

3,101,621
RECIPROCATING ENGINES
Thomas Walter Bunyan, 7 Eversley Road, Upper
Norwood, London SE. 19, England
Filed Nov. 25, 1960, Ser. No. 71,626
6 Claims. (Cl. 74—60)

The present invention relates to improvements in reciprocating engines of all kinds utilising reciprocating cylinder-piston-units, e.g. steam engines, compression-ignition and spark-ignition motors, pumps and the like.

The invention relates in particular to reciprocating engines of the kind comprising a crankshaft having a crankpin with its axis inclined to that of the crankshaft, axially opposed cylinder-piston-units in angular distribution about the axis of the crankshaft and with the cylinder and piston axes extending in a general direction parallel to the axis of the crankshaft, a plurality of transmission structures mounted by bearings on the inclined crankpin of the crankshaft and coupling means spaced from the crankpin and connecting the transmission structures with the reciprocating elements of the cylinder-piston-units, so that with impulses applied simultaneously by or in opposed-cylinder piston units the coupling means rock in a plane or planes containing the axis of the crankshaft and substantially no axially directed load is applied upon the crankshaft.

The transmission structures in such engines are required to be rigid or stiff with respect to each other in the axial direction but some small degree of relative angular movement between the individual transmission structures transversely or in other words in the general circumferential direction about the crankshaft axis is involved which give rise in operation to excessive strains and attempts have been made to meet this problem by the use of separate bearings for different transmission structures on the inclined crankpin.

It is one object of the present invention to provide an improved form of engine of the above described kind which in addition to offering a greater degree of variation and tolerance in cylinder and crankshaft alignment in manufacture and under service conditions than has hitherto been available, provides transverse flexibility of the transmission structures whilst retaining high rigidity with respect to each other in the general axial direction of the crankshaft.

In accordance with the invention an engine of the kind indicated above is provided wherein articulated connections are provided between some or each of the transmission structures and bearing members at the respective ends of the inclined crankpin and each transmission structure is connected with at least one adjacent transmission structure by a flexible shear plate so disposed as to admit of relative transverse angular movement between transmission structures whilst maintaining substantially complete rigidity in the axial direction.

The transmission structures may be of a general triangular form with the two ends of one side of the triangle in articulated connection with the bearings on the inclined crankpin and with the angle of the triangle opposite said one side connected through an appropriate coupling with the pistons of two axially opposed and aligned compression-ignition cylinder-piston-units, and with four such transmission structures disposed in two planes intersecting at right angles to one another at the axis of the crankshaft and each connected by flexible shear plates with two adjacent transmission structures, diametrically opposite cylinders being arranged to fire simultaneously.

In some cases it is convenient to effect a rigid instead of an articulated connection between one or more of the transmission structures and the bearing members in order to provide guide means avoiding any tendency of the assembly of transmission structures and bearing members to rotate as a whole.

In accordance with a further feature of the invention the assembly of transmission structures and the end bearings connected therewith are arranged to be capable of floating movement axially upon the inclined crankpin.

Thus, in the event of a cylinder failing to fire, a circumstance which would normally give rise to a state of unbalanced axial loads, the assembly of transmission structures and bearings will move axially on the crankpin in the direction to cause an increase in compression ratio to occur in the bank of cylinders which includes the defective cylinder, and the increased firing pressures which accrue compensate in part for the drop in the mean pressure caused by the defective cylinder and substantially complete stability will be achieved with a quite small displacement of the assembly on the inclined crankpin.

It should be observed that the compression ratio of the bank containing the defective cylinder is increased by the same amount that the compression ratio of the correctly functioning bank of cylinders is reduced, a combined effect tending to minimise the extent of the axial displacement of the assembly on the crankpin.

The extent of the axial movement of the assembly of transmission structure and end bearings on the crankpin is a function of the instantaneous sum of the cylinder pressures of the cylinders in the same radial plane at one end of the engine with respect of the instantaneous sum of the cylinder pressures in the same or the corresponding radial plane at the other end of the engine.

Thus when the pressures are zero i.e., when the engine is stationary, the assembly may be located anywhere in its limited path of travel along the crankpin and the condition may even exist where the end cheek of one of the end bearings abuts the adjacent crank web and such positions are not the best from the point of view of engine starting.

In accordance with a further feature of the invention means are provided, utilising fluid pressure, to enable the assembly of transmission structures and end bearings to be moved to an approximate mid-position on the crankpin to facilitate starting up the engine.

The invention is illustrated by way of example as applied to a compression ignition engine having four cylinder-piston-units each consisting of two co-axially aligned cylinders and two pistons disposed at four parallel edges of a rectangular cube, and four transmission structures disposed in two planes intersecting one another at right angles at the axis of the crankshaft.

Figure 1:
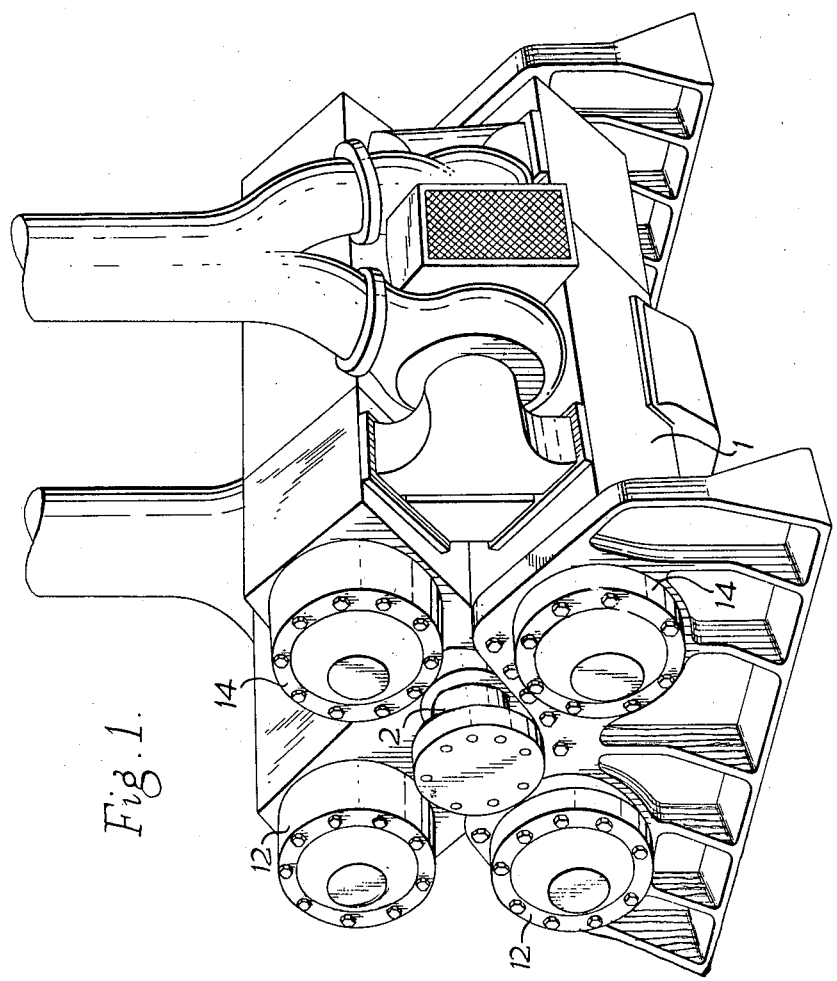
FIG. 1 is a general perspective view of the exterior of the engine.

Referring to the drawings, the engine shown comprises a rigid frame 1 having a crankshaft 2 mounted for rotation in co-axial end bearings 3 fixed on the frame 1.

The crankshaft comprises two end portions 4 and 5 having similar crank webs 6 and 7 each shaped to provide inner flat faces 8 and 9 one at each side of the crankshaft axis indicated by the line marked 10 (FIG. 2), which faces are inclined at similar acute angles to the crankshaft axis. Between these faces 8 and 9 extends a crankpin 11 rigidly fixed to or integral with the crank webs 6 and 7 and with the axis of the crankpin indicated by the line 42 in FIG. 2, inclined at an acute angle to the axis 10 of the crankshaft and intersecting it at a point mid-way between the two crank webs 6 and 7.

Figure 2:
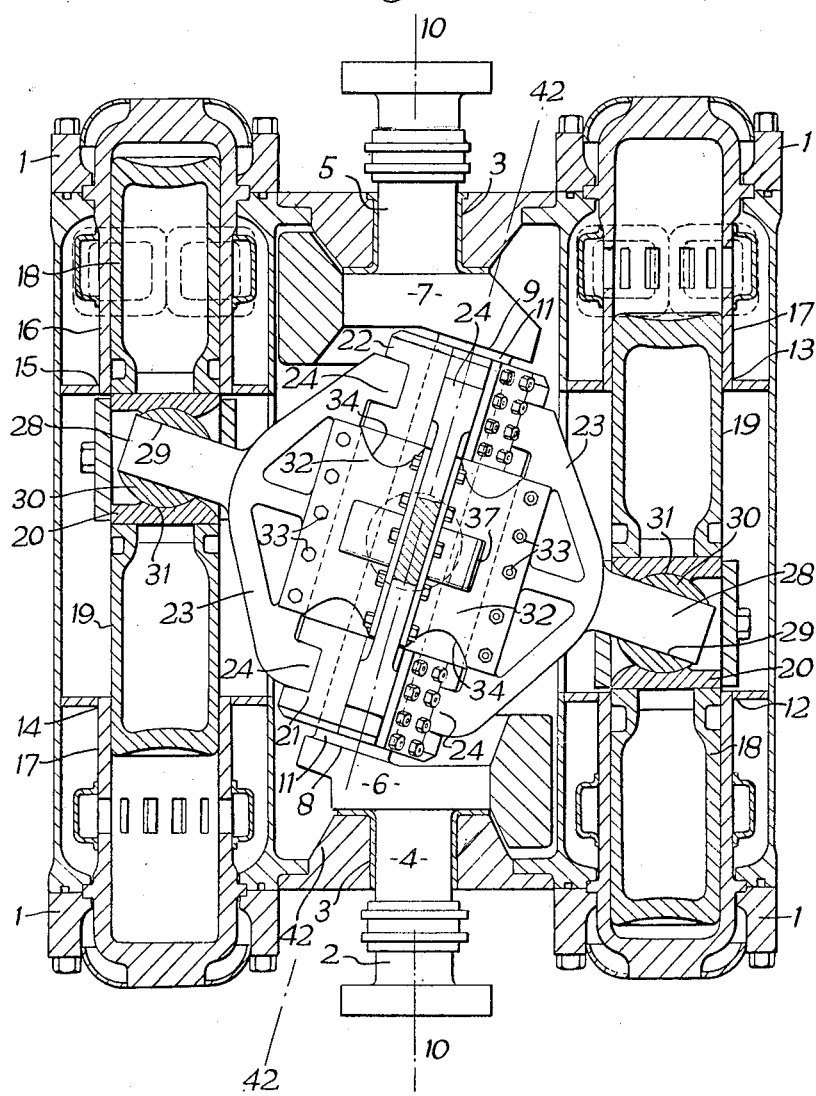
FIG. 2 is a view in sectional elevation taken on a single plane containing two of the transmission structures.

In the engine frame 1 are mounted four cylinder-piston-units of which two are shown at 12, 13 and 14, 15 in FIG. 2, each comprising two co-axial cylinders 16 and 17 and two pistons 18 and 19 rigidly connected together by junction pieces 20 for linear reciprocating movement parallel to the axis 10 of the crankshaft 2.

On the two opposite ends of the inclined crankpin 11 are mounted ring bearings 21 and 22 in which the crankpin 11 can rotate and a transmission structure is connected between each junction piece 20 and the two bearing rings 21 and 22.

The transmission structures are formed by stiff plates 23 of approximately isosceles triangular form having apertured lugs 24 at the two opposite ends of the base of the triangle engaged in recesses 25 formed in the outer peripheral walls of the ring bearings 21 and 22 (see FIG. 3) and retained in said recesses 25 by circular section pins 26 engaged in axially directed apertures 27 in the ring bearing and in the apertures in the lugs 24, thus providing the articulated connections between the plates 23 of the transmission structures and the ring bearings 21 and 22. The plates 23 at the angles remote from the crankpin are shaped to form spigots 28 making sliding engagement in apertures 29 in coupling members having the form of cylindrical or spherical blocks 30 mounted for rocking movement in housings 31 formed in the junction pieces 20.

Four such transmission structures are employed in the case illustrated, disposed in two planes intersecting at right angles to one another and containing the axis of the crankpin 11.

The plate 23 of each transmission structure is connected with the two adjacent plates 23 by means of shear plates 32 of externally concave arcuate section each bolted at their two edges to two plates 23 along lines parallel to the axis of the crankpin 11 as shown at 33.

The flexible shear plates 32 in the case shown extend over between one half and one third of the length of the bases of the triangular plates 23 and their end edges may be recessed inwards from the ends as shown at 34 to minimise stress concentration effects.

It will readily be seen that by arranging diametrically opposite cylinders 16, 16 and 17, 17 (FIG. 2) in each plane containing two of the transmission structures to fire simultaneously the axially stiff but transversely flexible assembly of transmission structures enables a state of axial balance of firing loads to be achieved while allowing the necessary transverse angular flexibility between adjacent transmission structures.

The axial length of the assembly of transmission structure 23 and the end bearing rings 21 and 22 is less than that of the crankpin 11 so that the assemlby is capable of a limited axial sliding movement on the crankpin 11 between the webs 6 and 7.

With this arrangement should one of the cylinders fail to fire, a condition which would normally result in a state of unbalance in the engine, the assembly comprising the transmission structures and the end bearing rings will move along the inclined crankpin in the direction towards that end bank of cylinders which contains the defective cylinder with a resulting increase in the compression ratio in that same bank of cylinders and the accruing increase in firing pressure in the cylinders of that bank will compensate in part for the drop in the mean pressure caused by the defective cylinder and a condition approaching stability will be achieved.

With the assembly of transmission structures 23 and end bearings 21 and 22 displaced from the mid-way position along the crankpin 11 and possibly with an end bearing ring in abutting engagement with one of the crank webs 6 or 7 while the engine is stationary, difficulty may be encountered in starting the engine.

Means are therefore provided to enable the assembly to be moved to the mid-way position as a preliminary to starting the engine.

The means for this purpose comprise an annular thrust flange 35 (FIG. 3) formed upon or fixed in sealed engagement on the crankpin 11 at the mid-point of the length thereof.

A hollow annular casing 36 of channel section and with a channel width greater than that of the flange 35 is fixed in apertures formed in the shear plates 32 in a position in which the flange 35 is embraced between but spaced from the side walls 36' and 36'' of the channel.

The bottom 37 of the channel or casing 36 is arranged with a small running clearance between itself and the outer peripheral surface of the thrust flange 35 and the free edges of the side walls 36' and 36'' of the hollow casing 36 are arranged with a small running clearance between themselves and the surface of the crankpin 11.

The wall of the bottom 37 of the hollow casing 36 is provided with a passage 48 connected through a pipe 49 with a source (not shown) of pressure fluid and with pairs of divergent ports 38 and 39 leading from the passage 48 through said wall towards the outer peripheral surface of the thrust flange 35.

Pairs of spaced passages 40 and 41 are formed in the flange 34 each leading from the outer peripheral surface thereof to one of the two spaces in the hollow casing 36 on the two sides of the flange 34.

Figure 3:
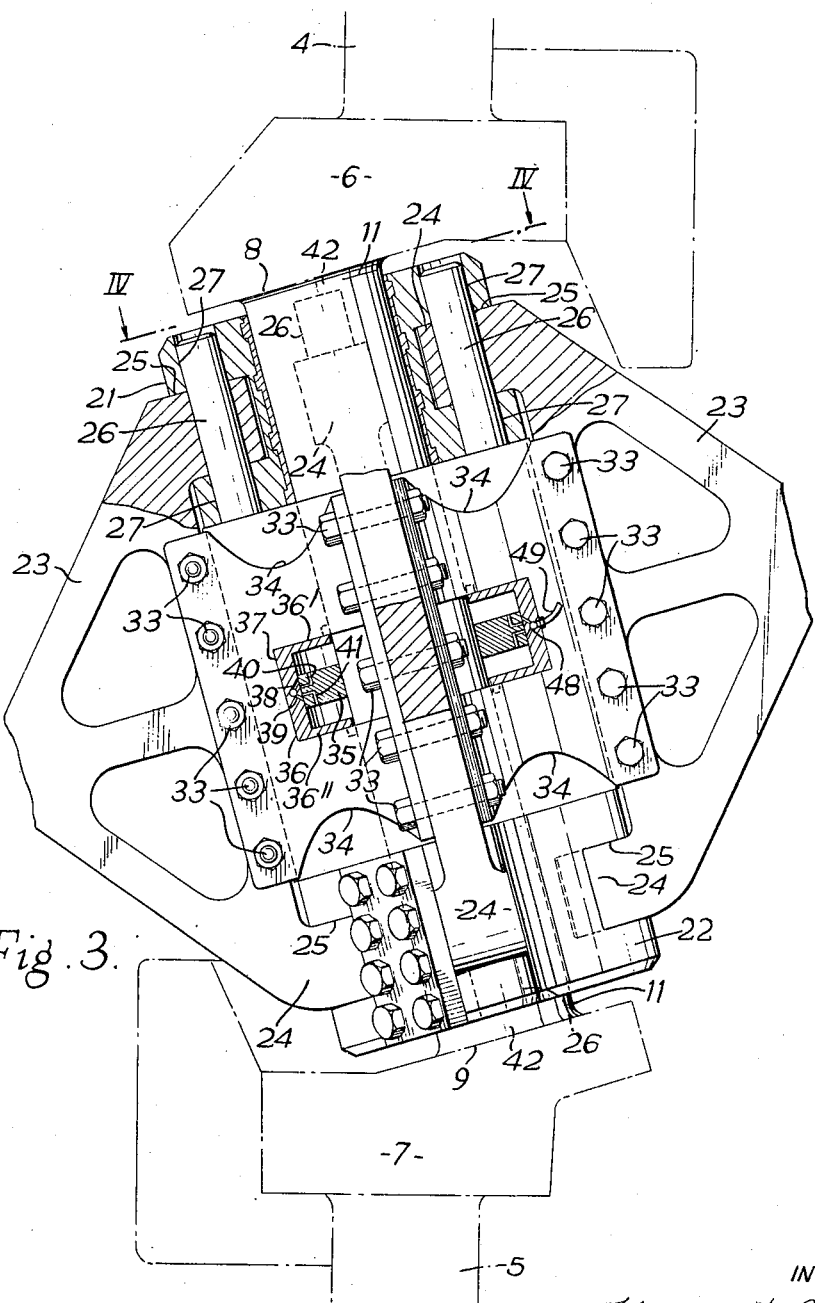
FIG. 3 is a part sectional elevation and on a larger scale.

The assembly of transmission structures 23 and end bearing rings 21 and 22 is shown in FIG. 3 in the normal operative position mid-way of the length of the crankpin in which position neither of the ports 38 and 39 in the bottom wall of the hollow casing 36 is in register with entry ends of either of the passages 40 and 41 in the thrust flange 35.

Assuming the engine has come to rest with the assembly away from that mid-way position e.g. in a lower position than that shown in FIG. 3 with the lower end of the end bearing ring 22 closer to the lower crank web 7, the port 38 (shown uppermost in FIG. 3) in the hollow casing 36 will register with the entrance to the upper passage 40 in the flange 35 and the other or lower port 39 will be out of register from the entry end of the other or lower passage 41.

By the application of pressure fluid through pipe 49 and passage 48 pressure will be applied through registering ports 38 and passages 40 in the upper space between the thrust flange 35 and upper side wall of the hollow casing 36 and the assembly will be caused to move towards the mid-way position on the crankpin 11 until the port 38 has moved from register with the entrance to passage 40. Residual pressure if any, existing in the space at the other side of the thrust flange is relieved by way of the clearance between the edge of the wall 36'' of the casing 36 at that side of the flange 35 and the surface of the crankpin 11.

Similarly if the assembly is at rest in a position above that shown in FIG. 3, pressure fluid will be introduced into the space between the flange 35 and the lower wall 36'' of casing 36 to move the assembly downwards into at least approximately the mid-way position on crackpin 11.

The source of pressure fluid for moving the assembly as described above may be the starting compressed air used to start the engine or alternatively hydraulic oil pressure may be used. The engine having started the supply of pressure fluid to the hollow casing 36 may be cut off or reduced to atmospheric or ambient pressure.

Figure 4:
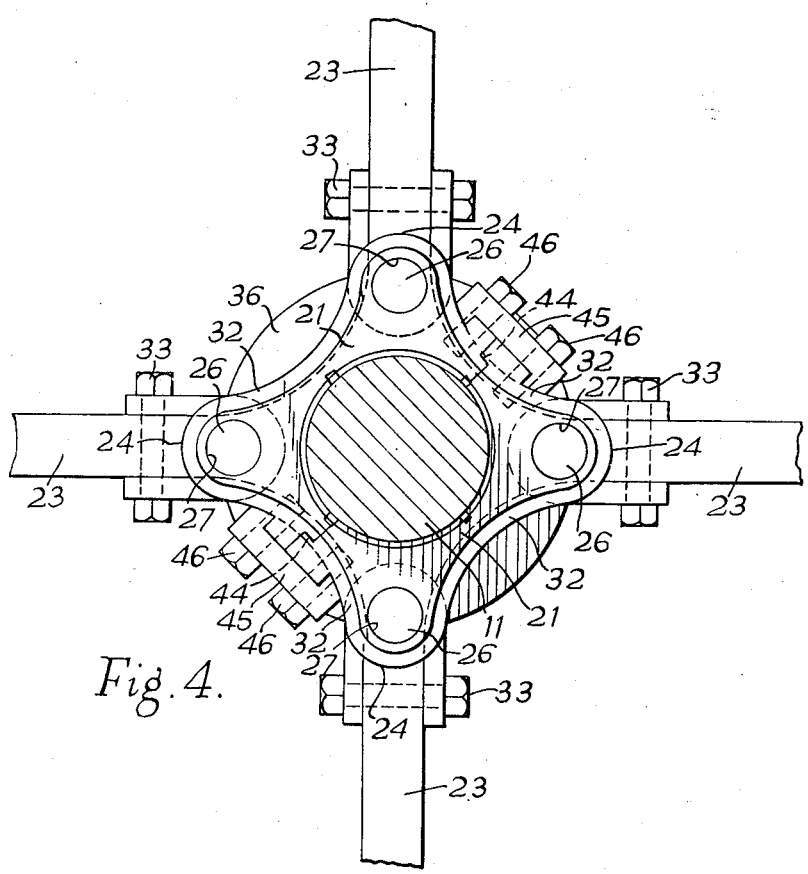
FIG. 4 is a sectional plan taken on the line IV—IV of FIG. 3.

As an example only, the end bearing rings 21 and 22 may each be formed of two half rings (FIG. 4) having mating stepped surfaces 44, transverse keys 45 and securing studs or bolts 46 for holding the ring parts assembled about the crankpin 11.

I claim:

1. An engine comprising: a crankshaft having a crankpin disposed with its axis inclined to the axis of the crankshaft; a plurality of axially opposed cylinder-piston-units disposed in angular distribution about the axis of the crankshaft and each including a reciprocating element movable in the direction generally parallel to the axis of the crankshaft; a plurality of stiff transmission structures in angularly spaced planes extending outwards from and containing the axis of said crankpin; bearings at each end of said crankpin; coupling means connecting the outer ends of the transmission structures with the reciprocating elements of said cylinder-piston-units; means providing articulated connection between at least one of said transmission structures and said bearings with relative movement about an axis generally parallel with the axis of the crankpin; and shear plates flexible in the direction circumferentially of the crankpin, connecting at least said one of said transmission structures with at least one other of said transmission structures permitting relative transverse angular movement between transmission structures.

2. An engine comprising: a crankshaft having a crankpin disposed with its axis inclined to the axis of the crankshaft; a plurality of axially opposed cylinder-piston-units disposed in angular distribution about the axis of the crankshaft and each including a reciprocating element movable in the direction generally parallel to the axis of the crankshaft; a plurality of stiff and generally flat transmission structures of generally isosceles triangular form in angularly spaced planes extending outwards from and containing the axis of said crankpin; bearings at each end of said crankpin; coupling means connecting the corner of the triangle of each of the transmission structures opposite said one side of the triangle with the reciprocating elements of said cylinder-piston-units; means providing articulated connection between the said two ends of one side of the triangle of at least one of said transmission structures and said bearings with relative movement about an axis generally parallel with the axis of the crankpin; and shear plates flexible in the direction circumferentially of the crankpin connected in face-to-face relationship with at least said one of said transmission structures and at least one other of said transmission structures permitting relative transverse angular movement between transmission structures.

3. An engine as claimed in claim 1 wherein said shear plates are of externally concave arcuate section in planes normal to the axis of the crankpin and including fixing elements connecting each of said shear plates in the region of the two longitudinal edges thereof with two adjacent transmission structures.

4. An engine as claimed in claim 1 wherein the said crankpin is of greater axial length than the axial distance between the outer end surfaces of the assembly comprising said bearings at each end of the crankpin and the transmission structures, whereby movement of the assembly axially along the crankpin is permitted.

5. An engine comprising: a crankshaft having a crankpin disposed with its axis inclined to the axis of the crankshaft; a plurality of axially opposed cylinder-piston-units in angular distribution about the axis of the crankshaft and each including a reciprocating element movable in the direction generally parallel to the axis of the crankshaft; an assembly comprising a plurality of stiff transmission structures in angularly spaced planes extending outwards from and containing the axis of said crankpin and bearing members adjacent to but spaced from each end of said crankpin connecting the inner ends of said transmission structures with said crankpin; coupling means connecting the outer ends of the transmission structures with the reciprocating elements of said cylinder-piston-units; and pressure-fluid-operated means moving said assembly of transmission structures and bearing members in either direction along said crankpin to a position substantially central of the length thereof.

6. An engine comprising: a crankshaft having a crankpin disposed with its axis inclined to the axis of the crankshaft; a plurality of axially opposed cylinder-piston-units in angular distribution about the axis of the crankshaft and each including a reciprocating element movable in the direction generally parallel to the axis of the crankshaft; an assembly comprising a plurality of stiff transmission structures in angularly spaced planes extending outwards from and containing the axis of said crankpin and bearing members adjacent to but spaced from each end of said crankpin connecting the inner ends of said transmission structures with said crankpin; coupling means connecting the outer ends of the transmission structures with the reciprocating elements of said cylinder-piston-units; and pressure-fluid-operated means comprising an annular thrust flange fixed on the crankpin, a channel section hollow casing fixed to the said assembly of transmission structures and bearing members with the walls of the channel on opposite sides of and spaced from the fixed thrust flange and the bottom of the channel and between the free edges of the channel and the surface of the crankpin, relatively movable passages in the wall of said channel and in the fixed thrust flange making selective registration according as the said assembly of transmission structures and bearing members is located at one side or the other of a position central of the length of the crankpin, and means introducing pressure fluid through registering passages into the space between a channel wall and the fixed thrust flange at one side or the other of the fixed thrust flange and thereby increasing said space and moving the channel and the assembly of transmission structures and bearings towards and into a substantially central position on said crankpin.

References Cited in the file of this patent

UNITED STATES PATENTS 2,182,213    Redrup _____ Dec. 5, 1939

FOREIGN PATENTS 680,602    France _____ May 2, 1930